United States Patent [19]
Kemper

[11] 3,842,963
[45] Oct. 22, 1974

[54] APPARATUS FOR TRANSPORTING A PLURALITY OF ELEMENTS

[76] Inventor: Kate Kemper, Lange Strasse 8-10, D-4835 Rietberg 2, Germany

[22] Filed: Feb. 24, 1972

[21] Appl. No.: 228,851

[30] Foreign Application Priority Data
Feb. 27, 1971 Germany............................ 2109363

[52] U.S. Cl........... 198/31 AC, 198/31 AB, 198/94, 198/99, 198/140
[51] Int. Cl............................................ B65g 47/26
[58] Field of Search ........... 198/140, 78, 81, 82, 86, 198/89, 90, 91, 94, 99, 31 R, 31 AB, 31 AC, 35

[56] References Cited
UNITED STATES PATENTS
| | | | |
|---|---|---|---|
| 499,460 | 6/1893 | Hooper | 198/86 |
| 669,571 | 3/1901 | Berghoefer | 198/140 |
| 1,984,980 | 12/1934 | Muller | 198/81 |
| 3,106,280 | 10/1963 | Baker | 198/31 AB |
| 3,348,678 | 10/1967 | Flowers | 198/99 |
| 3,403,444 | 10/1968 | Chollet | 198/140 X |
| 3,549,144 | 12/1970 | Lucas | 198/35 |
| 3,556,280 | 1/1971 | Schnee et al. | 198/31 AB |

FOREIGN PATENTS OR APPLICATIONS
470,302   5/1969   Switzerland........................ 198/140

*Primary Examiner*—Evon C. Blunk
*Assistant Examiner*—Joseph E. Valenza
*Attorney, Agent, or Firm*—Spencer & Kaye

[57] ABSTRACT

An apparatus for transporting a plurality of elements comprises at least two parallel transport devices fed by an element feed device for both positioning and feeding the elements, a main control system for controlling the operation of the apparatus and a subsidiary control system controlled by the main control system for controlling the element feed device and the transport devices.

14 Claims, 7 Drawing Figures

(A-A)

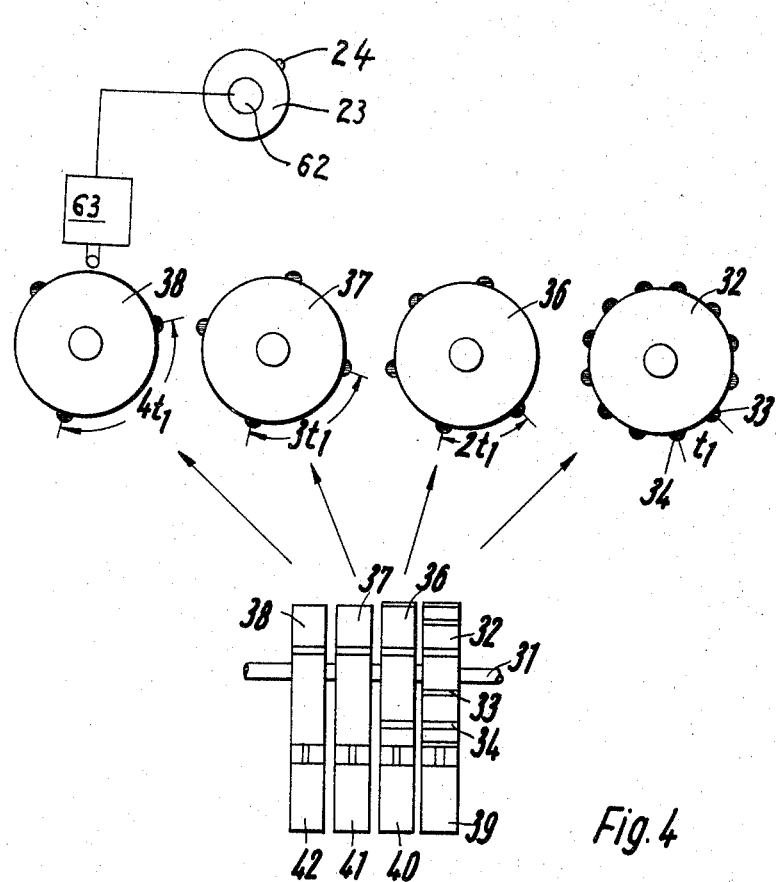
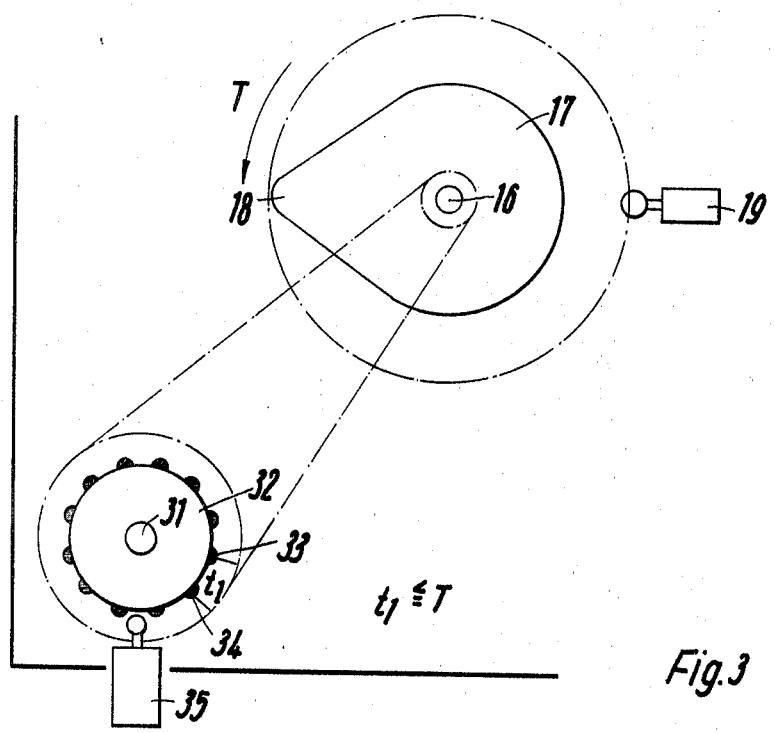
Fig. 4
Fig. 3

APPARATUS FOR TRANSPORTING A PLURALITY OF ELEMENTS

BACKGROUND OF THE INVENTION

The invention relates to an apparatus for transporting a plurality of elements, especially pieces of dough in a proving cabinet.

The methods of working doughs for the production of bread or the like differ according to the nature of the dough. Thus by way of example wheat and wheat mixture bread doughs are handled differently from rye and rye mixture bread doughs. While the rye mixture bread doughs are made up directly, that is worked continuously without interruption, the wheat and wheat mixture bread doughs require a so-called intermediate proving (resting interval) between the handing-up and long molding, according to the level of the gluten content. This signifies that the working process is interrupted in the case of these kinds of dough.

In very small plants such an interruption of work is not a problem however, since by reason of the low production figures there is usually sufficient space in the bakery for an intermediate proving to be effected. With increasing production, that is on raising the number of pieces, such a method is however no longer practicable, since there is not sufficient space for it to be possible to lay aside the dough pieces. Moreover endeavors are made to be able to carry out all processing methods if possible fully automatically and mechanically. This relates both to the direct working methods, such as dough dividing, handing-up, long-molding, etc., and to the carrying out of intermediate proving. For this purpose so-called proving cabinets are known in which there are carriers for proving goods in parallel rows, for example suspended on a chain, which carriers are arranged to circulate. The proving cabinet can be provided with an air-conditioning plant so that the conditions for the intermediate proving can be kept uniformly favorable. In these known proving cabinets the introduction of the dough pieces always takes place in the first row of the proving hanger attachments, which can be made in the form of pockets and consist for example of a metal or synthetic plastics grid. Now after passing through a part of the first row of the proving hanger attachment the dough parts are thrown, with the aid of an operable flap or of a plate arranged obliquely of the transport direction of the proving hanger attachment, out of the proving carrier into another proving carrier in the row arranged therebeside. Now similar devices are provided to transfer the dough parts, after passing through a part of the second, third, fourth hanger attachment etc., into a third, fourth hanger attachment and so forth correspondingly arranged therebeside. Thus the object is achieved that despite the parallel arrangement of the individual hanger attachments the dough parts run through these in succession, whereby the distance which the parts travel in the proving cabinet is multiplied according to the number of the proving hanger attachments.

Now it has appeared that the dough parts subjected to intermediate proving must be treated as protectively as possible, in order for example to achieve a uniform and favorable pore development. Moreover after the commencement of the intermediate proving the dough parts display an increasing sensitivity to mechanical stressing, such as occurs for example in the transference of a dough part.

Now in the known proving cabinets as described above the transference of the dough parts have one proving hanger attachment to the other takes place after the commencement of the intermediate proving, that is at a time when the sensitivity of the dough parts as regards mechanical stressing is increasing.

On the other hand furthermore it has been ascertained that it is especially advantageous for the dough parts if they are carefully continuously rolled around within the proving carrier during the intermediate proving. If the dough parts are allowed to rest completely after leaving the hander-up, the possibility exists that the liquids present in the dough may sink, so that completely uniform dough parts are no longer available for further working after the completion of the intermediate proving. Such deviations can under some circumstances cause an unfavorable influencing of the baked dough.

SUMMARY OF THE INVENTION

It is an object of the invention to eliminate or reduce some or all of the above mentioned disadvantages of the known apparatus.

It is also an object of the invention to provide a proving cabinet which, with minimum space requirement, can accommodate a maximum possible number of dough pieces with most protective treatment, the dough pieces being subjected, during the circulation in the proving cabinet, within the dough carrier, to a cautious shifting of position.

According to the invention there is provided apparatus for transporting a plurality of elements comprising two or more parallel transport devices, an element feed device for positioning said elements relative to said two or more parallel transport devices and for feeding said elements to said two or more parallel transport devices, a main control system for controlling the operation of the apparatus and a subsidiary control system, controlled by said main control system, for controlling the positioning function and the feeding function of said element feed device and movement of said two or more parallel transport devices.

BRIEF DESCRIPTION OF THE DRAWINGS

The invention will now be described in greater detail, by way of example, with reference to the drawings, in which:

FIG. 3 shows a part of the guide control system with a part of the distance-plan control system, reproducing an example of embodiment;

FIG. 4 shows control discs of a distance-plan control system;

In the individual Figures the same or corresponding elements are provided with the same reference numerals.

DESCRIPTION OF THE PREFERRED EMBODIMENTS

Figure 1:
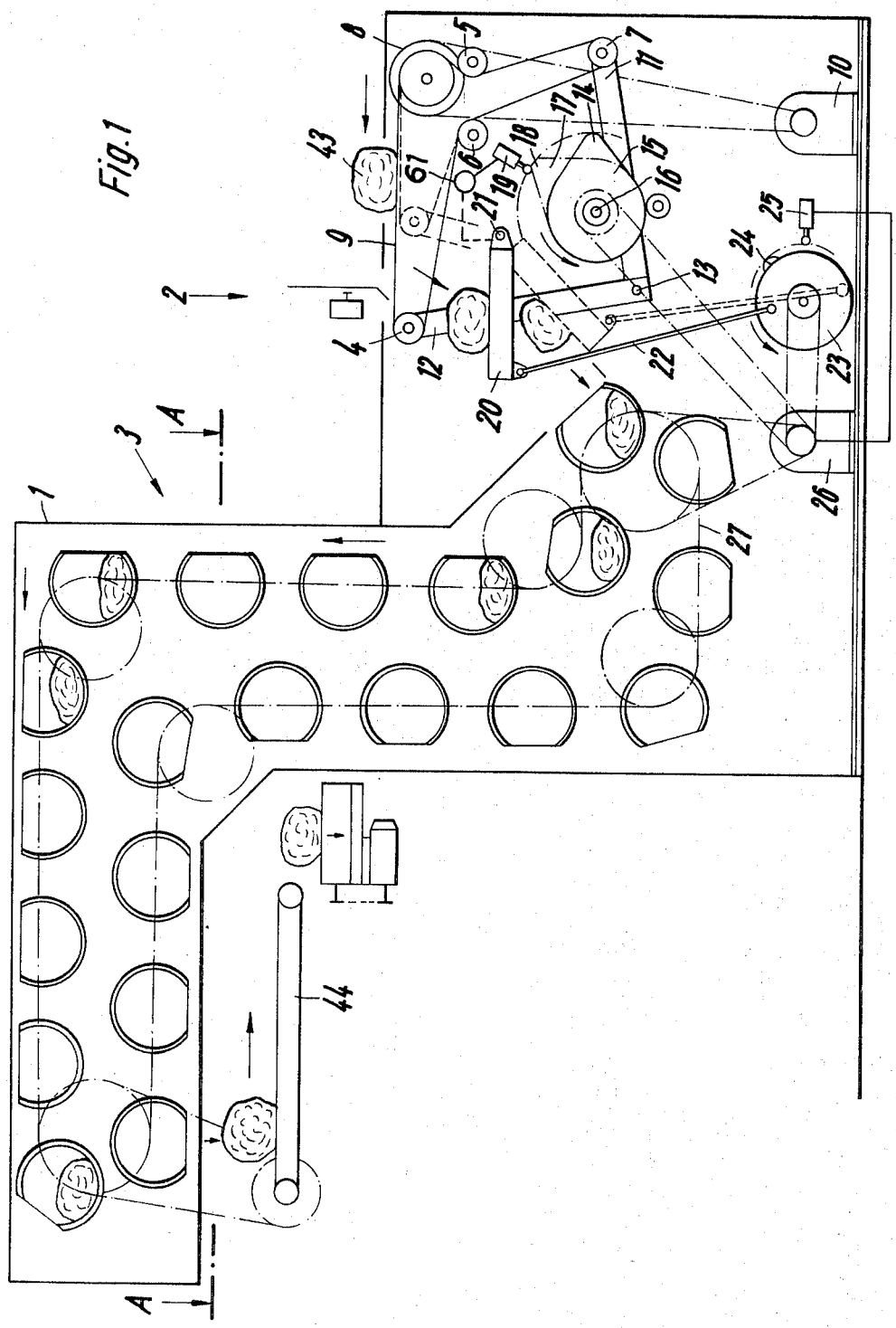
FIG. 1 shows a cross-section through a proving cabinet with a device for the control of the transport distance according to the invention, in simplified diagrammatic representation.

Basically the invention proposes, in an apparatus for transporting a plurality of elements and having at least two parallel running transport devices which may be regarded as a "first, endless conveyor", that a guide control system determining the working rhythm of the entire installation be arranged to be capable of acting upon a programmable distance-plan control system which in turn step by step controls the drives of an element feed device which may be regarded as a "second, linear conveyor" capable of executing two working actions and the drive of at least one element transport device. The guide control system is formed as a cam disc rotatably connected with a main drive and arranged to be capable of acting on the one hand upon a linkage of an element-entry device and on the other upon the distance-plan control system. The element-introducing device here advantageously consists of a belt which is stretched over various deflecting pulleys, some secured to a linkage, and over a drive pulley, the linkage being pivotable about a pivot point by action of the cam disc, in such a way that the stretched belt changes its position in relation to the proving cabinet entry.

The distance-plan control system may be formed as a pulse emitter which acts upon a coupling of a drive motor, designed as braking geared motor, for the element feed device, through switch elements, and which actuates these step by step, according to programming, while the pulse emitter acts, after execution of the last programmed transport step of the element feed device, upon an electro-magnetic coupling of a drive for the acutation of an eccentric disc, connected through linkage with the element feed device, for the execution of a tilting movement of the element feed device. This pulse emitter in one form of embodiment of the invention is made programmable as a press-button control system, so that the number of the transport steps of the element feed device which are to be executed is freely selectable.

The pulse emitter of the distance-plan control system may consist of a number of command units adapted to the number of the element transport devices, each of which units consist of three control discs provided with contact closure elements and rotatable about one common spindle, while to each control disc there is allocated a switch element for the instigation of a step-by-step transport of the element feed device, a switch elemenet for the instigation of a tilting movement of the element feed device and a switch element for the instigation of a transport step of the element transport device.

The number of the contact closure elements of a specific control disc of a command unit is advantageously different from the number of the contact closure elements of a corresponding control disc of another command unit and is in a specific ratio thereto. According to the invention the first element transport device is allocated to the first command unit, the first and second element transport devices are allocated to the second command unit, and the first, second and third element transport devices are allocated to the third command unit.

The element feed device may have a conveyor belt which carries out a transport movement directed perpendicularly of the plane of transport movement of the element transport devices. This element feed device is tilted about a spindle whose axis lies in its transport direction, the tilt spindle being situated on the longitudinal side of the conveyor belt which is remote from the entry of the transport device. The angle of tilt is such according to the invention that the conveyor belt passes from a nearly horizontal position into an oblique position so that the elements situated on the conveyor belt pass into the corresponding entry of the transport device allocated to them.

Referring now to the drawings, in FIG. 1, 1 designates the housing of a proving cabinet which comprises a portion 2 in which a control arrangement with an element feed device and an element entry device is accommodated, and a portion 3 in which there are several parallel-arranged element transport devices. Moreover all the control devices, such as the guide control system and the distance-plan control system with its command units and pulse emitters, are in the portion 2.

The element entry device consists of a belt 9 stretched over various deflecting pulleys 4, 5, 6 and 7 and over a drive pulley 8, the drive pulley 8 and thus the belt 9 being set in motion by the motor 10. The pulleys 4 and 7 are rotatably secured on a linkage 11 and 12 which can be pivoted about the spindle 13 by the action of the cam 14 on the cam disc 15. On the spindle 16 of the cam disc 15 there is a further cam disc 17 with a cam 18 which is arranged to act upon a limit switch 19. However the cam 18 can also be directly secured on the cam disc 15, so that the second cam disc can be omitted.

Figure 2:
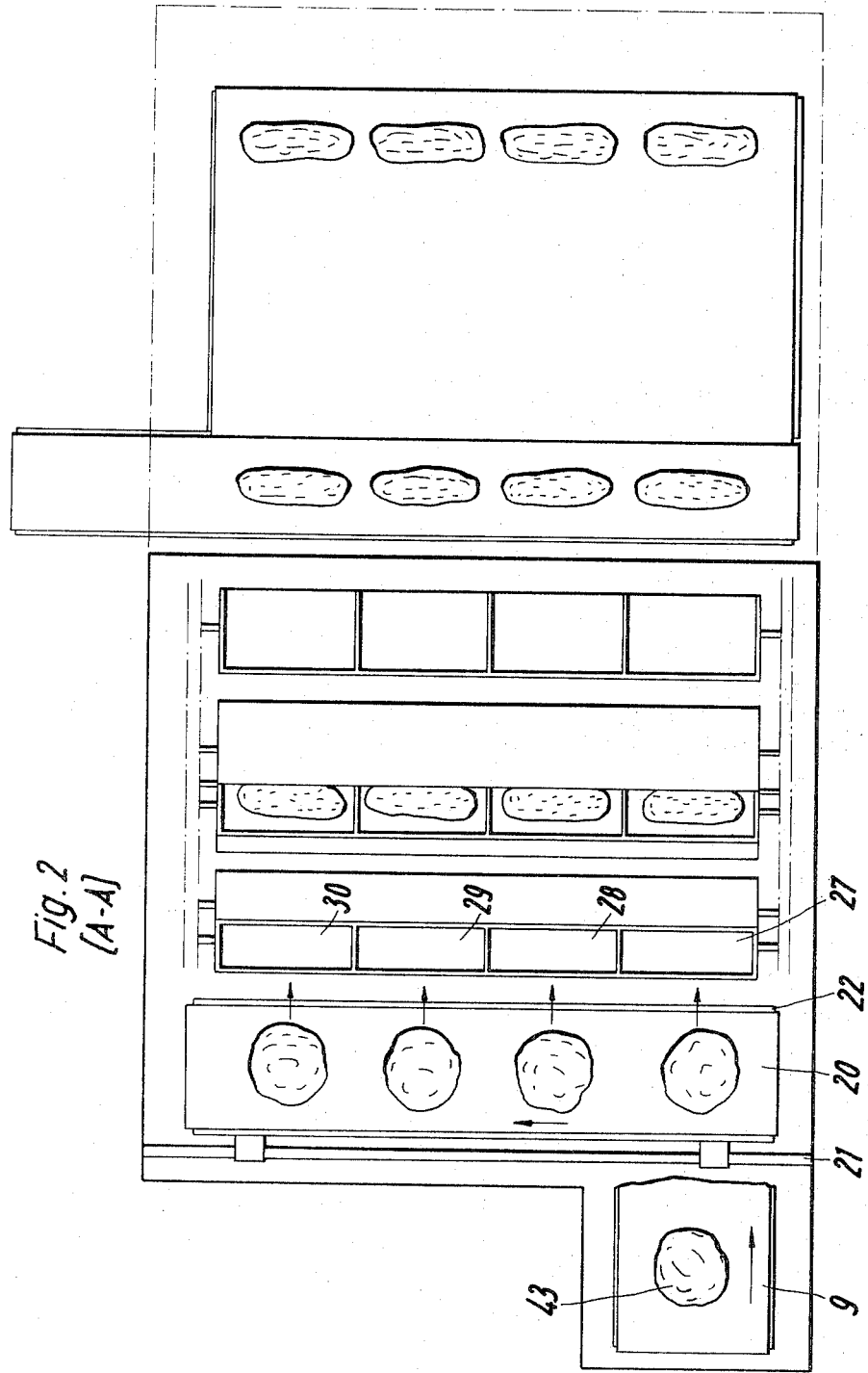
FIG. 2 shows a section A — A according to FIG. 1 or 5.

A conveyor belt 20 of the element feed device has a transport direction which lies perpendicular to the plane of FIG. 1. This conveyor belt 20 can be tilted about a spindle 21 into the position shown in chain lines by the linkage 22 which is eccentrically connected with the disc 23. On the disc 23 there is a cam 24 which is arranged to act upon a limit switch 25. The eccentric disc 23 is driven by the main motor 26 which at the same time drives the spindle 16 of the cam disc 15 and the element transport devices 27 to 30 (see also FIG. 2 in this connection).

The example of embodiment as represented in FIG. 1 is equipped with a guide and distance-plan control system which is represented diagrammatically in FIGS. 3 and 4. The guide control system here consists of the cam disc 17 rotating about the spindle 16 and acting with its cam 18 on the limit switch 19. The spindle 31 of the control disc 32 formed as pulse emitter is operatively connected with the spindle 16, and there is a specific fixed ratio between the speeds of revolution of the spindles 16 and 31. The control disc 32, which is not represented in FIG. 1 for reasons of space, possesses switch cams, for example the cams 33 and 34, uniformly distributed on its perihery, which act upon a switch 35 formed as sensor. As may be seen from FIG. 4, on the spindle 31 there are further control discs 36, 37 and 38, which can be rendered funcitonal respectively by corresponding press-button switches 39, 40, 41 and 42.

The manner of operation of the example of embodiment as represented in FIGS. 1 to 4 is now as follows:

A dough piece 43, which is supplied for example from a hander-up (not shown), passes on to the conveyor belt 9 of the element entry device which then feeds the dough piece 43 to the conveyor belt 20 when the guide control system, by means of the cam disc 15, pivots the linkage 11 and 12 about the spindle 13, while at the same time the dough piece 43 is thrown off by the movement of the belt 9, which is driven by the motor 10.

The distance-plan control system according to the invention now provides the possibility of feeding the dough piece, which is situated on the conveyor belt 20, directly to the first element transport device 27. However, according to choice, the possibility also exists of first receiving two, three or four dough pieces on the conveyor belt 20, which pieces then are fed simultaneously to their corresponding element transport devices 27, 28, 29 and 30. If it is to be assumed that a program is to be set, for this purpose the press-button control system 42 must be actuated which corresponds to this program, whereby the control disc 38 comes into action. The spindle 16 driven by the main motor sets the cam discs 15 and 17 in rotation. The first dough piece 43 was transported on to the conveyor belt 20 by the cam 14 of the disc 15 by pivoting of the linkage 11 and 12. A short time later the cam 18 of the cam disc 17 reaches the limit switch 19 which actuates an electric coupling of the drive motor 61 for the belt 20, so that the dough piece is transported by one stage and lies before the entry of the next succeeding element transport device. This action is repeated until a total of four dough pieces lie on the conveyor belt 20. At this moment a cam of the control disc 38 reaches a feeler switch 63 which actuates a coupling 62 for the drive of the eccentric disc 23, so that this carries out one full revolution. The linkage 22 thereby effects a tilting movement of the entire belt 20 about the spindle 21 so that all four dough pieces pass into the corresponding entries of the respective associated element transport devices. On the eccentric disc 23 there is the cam 24 which acts, after the execution of the tilting movement, upon the limit switch 25 which actuates a coupling for the drive of the element transport devices. The latter is thereby transported further by one stage, so that thus the next succeeding empty proving carriers come into the receiving position.

If by way of example only two element transport devices, namely 27 and 28, are to be filled, the pressbutton control system 40 must be actuated which renders the corresponding control disc 36 functional. The cams situated on this control disc actuate the coupling for the drive of the eccentric disc after the supply of a second dough piece on to the belt 20, so that the eccentric disc 23 is set in action only shortly after this moment, so that the belt 20 carries out a tilting movement whereby the two dough pieces pass into the empty proving carriers of the element transport devices 27 and 28.

If it is intended to fill only the first element transport device 27, the conveyor belt 20 carries out no movements, so that in this case the belt 20 can be held in the lowermost tilted position. In this case the limit switch 19 is short-circuited by actuation of the press-button control system 39 and the eccentric disc 23 assumes its lower position. The further transport of the element transport device 27 is taken over in this case by the guide control system, which consists of the cam discs 15 and 17 and the correspondingly associated limit switches.

The proving carriers of the element transport device assume various positions in the course of the travel through the proving cabinet, so that the dough pieces are rolled round in the proving carrier, whereby sticking is avoided. At the discharge station the proving carriers assume such a position that the dough pieces can fall out. For this purpose a path is available to them which can consist for example of three transport stages. Thus it is ensured that no dough piece remains in the proving carrier. The height of fall out of the proving carrier on to the conveyor belt 44 is kept extremely low so that the dough piece is exposed to no particular mechanical stressing.

Figure 5:
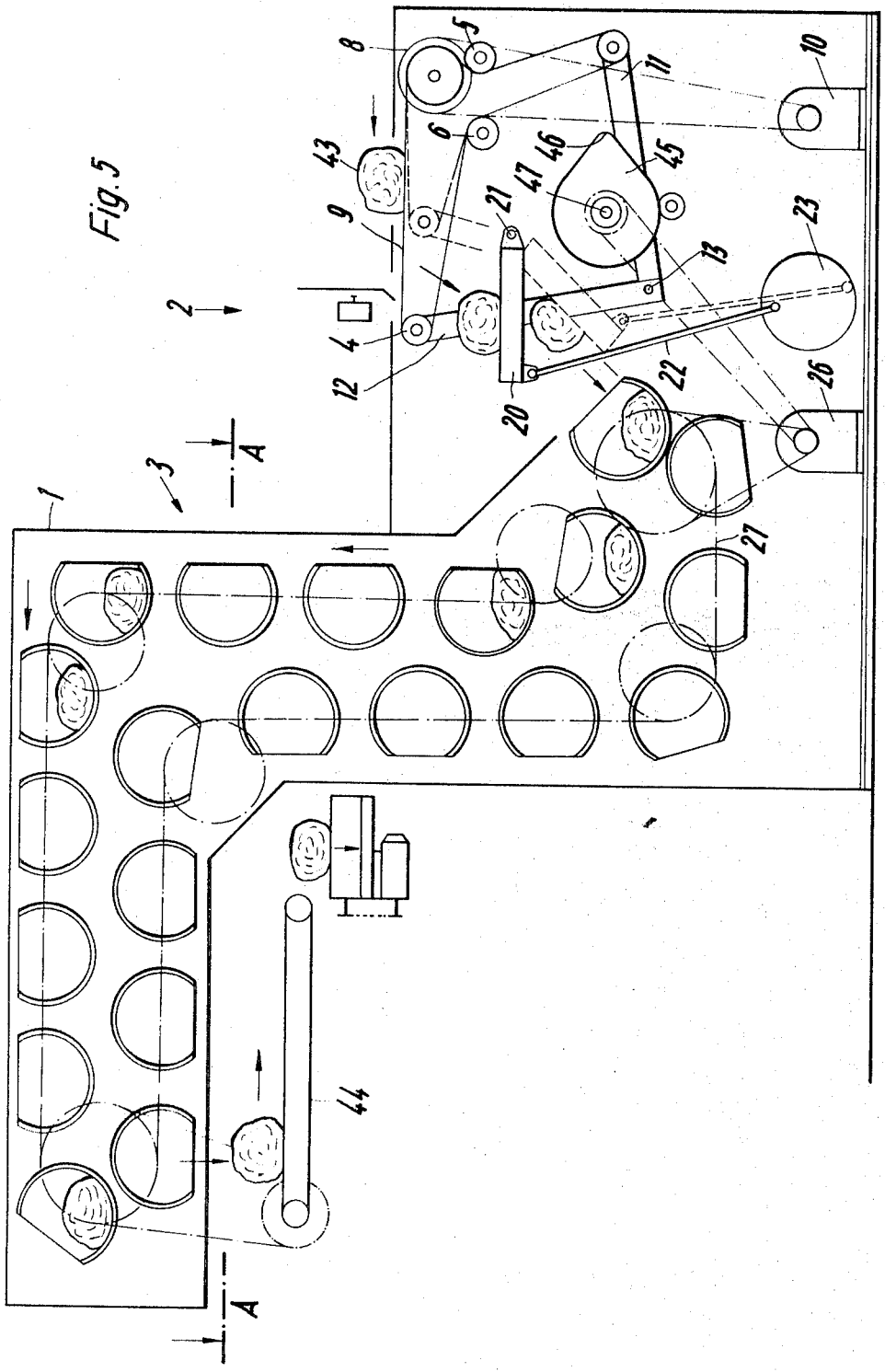
FIG. 5 shows a cross-section through a proving cabinet with a further form of embodiment of a device for the control of the transport distance according to the invention in simplified diagrammatic representation.
Figure 7:
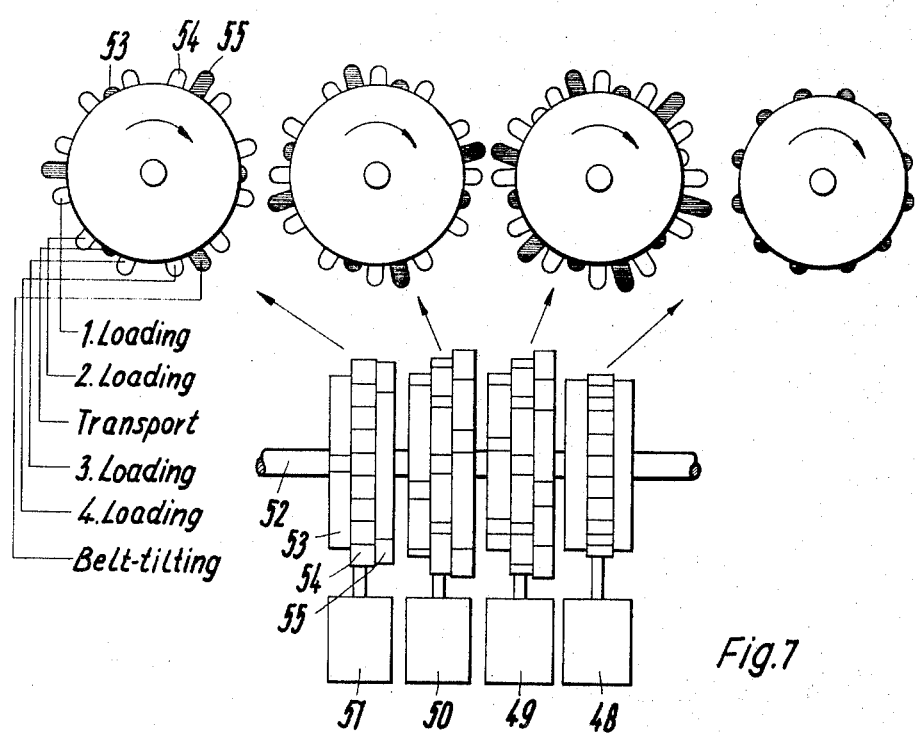
FIG. 7 shows command units with pulse emitters formed as control discs.
Figure 6:
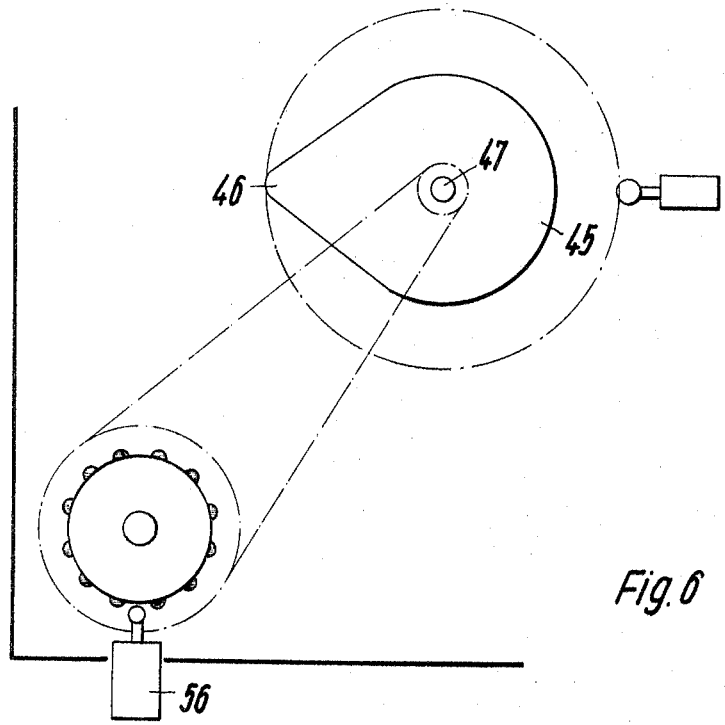
FIG. 6 shows a part of the guide and distance-plan control system.

In the example of embodiment as represented in FIGS. 5, 6 and 7 a guide control system is used which consists merely of the cam disc 45, which likewise is set in rotation by the main drive 26, so that the element entry device, which comprises the linkage 11 and 12 and the conveyor belt 9, carries out a pivoting movement as soon as the cam 46 acts upon the linkage 11. A distance-plan control system consisting of four command units 48, 49, 50 and 51 is operatively connected with the spindle 47 of the guide control system. Each of these command units comprises three cam discs which rotate about a common spindle 52. Each control disc, formed as pulse emitter, has allocated to it at least one switch element 56 (see FIG. 6) so that for example the control disc 53 serves for the tripping of a transport step of the element transport device, that is of the proving hanger attachment 27, 28, 29 and 30, the control disc 54 serves for the tripping of a step-by-step transport of the element feed device, that is of the belt 20, and the control disc 55 serves for the tripping of the tilting movement of the element feed device, that is again of the belt 20. These functions are exerted by the control discs when, by actuation of the correspondingly associated press-button control system, the respective command unit, in the case illustrated the command unit 51, is switched on, so that the program allocated to this command unit can proceed. As may be seen from FIG. 7, the control discs situated on the spindle 52 are so arranged in relation to one another that their corresponding cams exert their respective functions at a fixed moment in time. If by way of example the command unit 51 is actuated, thus a program is selected according to which all four element transport devices are filled, namely the transport devices 27, 28, 29 and 30. The working rhytm of the entire installation is here given by the guide control system 45.

However a substantial part of the switching operations which are necessary in the present invention can also be carried out with electronic equipment working for example with transistorized control systems.

However it is also possible to use electric control devices which work at the same time as pulse emitters and possess a re-setting unit. Thus the command units 48, 49, 50 and 51 of the distance-plan control system with their corresponding control discs, like the control discs 53, 54 and 55 of the command unit 51, can be replaced by a setting counter with automatic resetting. Such a counter is produced and sold, by way of example, by a firm J. Hengstler KG Zahlerfabrik, D-7207 Aldingen, Tuttlingen Circuit, under Manufacturing Number FA 043 and FE 043.2 E and F.

Such a setting counter can be pre-programmed so that a pulse is tripped for example only after one, two or three working actions, which pulse in turn is fed to a contactor which switches on the motor 26 for the execution of a working step. In the example of embodiment according to the invention four element transport devices, that is four hanger attachments for the proving carriers, namely 27, 28, 29 and 30, are used, so that a setting counter with a four-digit setting range is also sufficient. The desired setting range is programmed in before actuation of the proving cabinet control system, and after the desired range, for example after three working actions of the cam disc 15 or 45, whereby thus three dough pieces are situated on the conveyor belt 20, the counter trips a current pulse by which the motor 26 actuates the eccentric disc 23 through a contactor, so that all three dough pieces fall down at the same time and drop into the element transport devices 27, 28 and 29 respectively. After this has occurred, appropriate couplings are actuated in order to move the corresponding element transport devices 27, 28 and 29 forward by one step, so that then new proving carriers of the hanger attachments are available for charging with dough pieces.

Thus the invention provides an installation with the aid of which dough parts can be subjected to a proving process the time duration of which is freely selectable, in minimum space, the dough pieces being treated in an extremely protective manner.

It will be understood that the above description of the present invention is susceptible to various modifications changes and adaptations.

What is claimed is:

1. An apparatus for transporting a plurality of articles, comprising in combination:
   a. a first, endless conveyor having an overall width sufficient to support a plurality of discrete articles in aligned spaced relation transversely to its direction of travel;
   b. means for driving said first conveyor;
   c. a second, linear conveyor positioned adjacent to and extending transversely to said first conveyor;
   d. means for placing the articles uniformly spaced in a row on said second conveyor, said row extending transversely to said first conveyor;
   e. means for driving said second conveyor, whereby the articles are carried by said second conveyor transversely to said first conveyor;
   f. charging means for periodically and simultaneously dumping all the articles laterally off said second conveyor onto said first conveyor;
   g. means for driving said charging means;
   h. control means for periodically actuating said charging means as a predetermined number of said articles on said second conveyor is periodically brought adjacent said first conveyor; and
   i. arbitrarily settable means connected to said control means for altering the rhythm of actuation of said charging means, whereby the number of articles adjacent said first conveyor at the moment of each actuation of said charging means is variable so that the number of articles dumped simultaneously onto said first conveyor from said second conveyor is arbitrarily selectable.

2. An apparatus as defined in claim 1, wherein said arbitrarily settable means includes:
   a. a plurality of cam discs equalling the maximum number of said articles that can be simultaneously supported on said first conveyor transversely to its direction of travel, each disc having a different number of camming faces;
   b. means for rotating said cam discs in unison;
   c. cam sensor means operatively connected with each cam disc and with said means for driving said charging means; and
   d. means for rendering operative any selected one of said cam means, whereby the rhythm of operation of said charging maans is arbitrarily selected.

3. An apparatus as defined in claim 1, wherein said charging means includes tilting means connected with said second conveyor for periodically tilting said second conveyor laterally towards said first conveyor, whereby all articles disposed on said second conveyor at the moment of actuating said tilting means are simultaneously dumped by gravity onto said first conveyor.

4. Apparatus as defined in claim 3, wherein said second conveyor further comprises a conveyor belt, a tilting spindle lying adjacent and along said conveyor belt on the side thereof remote from said first conveyor for periodically tilting said conveyor belt between a horizontal position in which it receives and carries said articles and an oblique position in which said articles from said conveyor belt are dumped onto said first conveyor.

5. Aparatus as defined in claim 3, wherein said control means comprises an eccentric disc, a coupling through which said disc is driven and controlled by said arbitrarily settable means, and a linkage connecting said eccentric disc with said second conveyor for periodically tilting the same.

6. An apparatus as defined in claim 1, including stepping means connected to said means for driving stepwise said first conveyor, said stepping means including means responsive to the operation of said charging means, whereby said first conveyor is advanced one step subsequent to each charging operation.

7. An apparatus as defined in claim 6, including further stepping means connected to said means for driving said second conveyor for advancing in steps said second conveyor, whereby during each step each article on said second conveyor is advanced to a subsequent position adjacent said first conveyor and means for synchronizing said further stepping means with said control means whereby said charging means is operated solely upon completion of a predetermined number of steps of said second conveyor.

8. An apparatus as defined in claim 7, including a prover cabinet enclosing said first conveyor; said articles are dough elements to be fermented in said prover cabinet while carried by said first conveyor; said first conveyor is formed of a plurality of juxtaposed transport devices each having an endless chain and a plurality of dough trays spacedly mounted on said endless chain; the length of one step during the step-by-step advance of said first conveyor corresponds to the distance between two subsequent dough trays on one chain.

9. An apparatus as defined in claim 8, including means for rigidly securing each said dough tray to its chain.

10. Apparatus as defined in claim 17, wherein said arbitrarily settable means comprises a plurality of command units each associated with a specific predetermined number of said steps of said second conveyor between each actuation of said charging means.

11. Apparatus as defined in claim 10, wherein said each command unit comprises a first control disc, a first switch element actuated by said first control disc for actuating said means for driving said second conveyor, a second control disc, a second switch element actuated by said second control disc for actuating said means for driving said charging means, a third control disc and a third switch element actuated by said third control disc for actuating said means for driving said element transport devices.

12. Apparatus as defined in claim 11, wherein each said control disc has a plurality of closure elements therein for closing said switch elements, corresponding discs of different command units having different numbers of said closure elements in a specific ratio to each other.

13. Apparatus as defined in claim 11, wherein said first conveyor is formed of a plurality of juxtaposed transport devices; each said command unit controls one of said plurality of transport devices.

14. Apparatus as defined in claim 1, wherein said means for placing the articles on said second conveyor comprises a belt, a plurality of deflection pulleys over which said belt is stretched, a drive pulley for driving said belt, a linkage carrying at least two of said plurality of said deflection pulleys, pivot means for said linkage, pivoting means on said linkage, and means for periodically swinging said linkage to move said belt to a position in which it deposits an article from said belt onto said second conveyor.

* * * * *